Patented June 2, 1953

2,640,825

UNITED STATES PATENT OFFICE 2,640,825

AZO DERIVATIVES OF CARBOSTYRIL

Joseph Seruto, Meriden, Conn., assignor to American Cyanamid Company, New York, N. Y., a corporation of Maine No Drawing. Application June 17, 1949,
Serial No. 99,863

13 Claims. (Cl. 260—155)

This invention relates to new azo coloring matters containing the carbostyril nucleus.

In the past it has been considered impossible to produce azo coloring matters containing the carbostyril nucleus because carbostyril is incapable of coupling with diazo compounds except when the nucleus contains other activating groups.

The compounds of the present invention may be represented by the following structural formula:

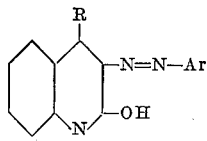

in which R is the radical of a functionally saturated hydrocarbon and Ar is an aromatic radical having a metallizable group ortho to the azo group. The carbon atoms of the benzo ring may be substituted by groups such as alkyl, aryl, halogen, nitro, amino or carboxyl.

The preferred compounds of the present invention are those in which the aromatic radical is sulfonated as they can be used in the dyeing of basic nitrogenous fibers; and preferably contains a metallizable group ortho to the azo linkage, thus permitting metallization.

While it is not intended to limit the new colouring matters of the present invention to a particular method of preparing the new series, it has been made possible by the use of a new process which in a more specific aspect of the present invention is claimed. This process, which is particularly useful in preparing preferred sulfonated dyestuffs, involves coupling an acylacetic arylide with a diazo component and the closing of the heterocyclic portion of the carbostyril nucleus by cyclization in the presence of a condensing agent, preferably concentrated sulfuric acid.

It is an important advantage of the present invention that the cyclization reaction proceeds very easily and is widely applicable to azo compounds from acylacetic arylides with a few obvious restrictions which will be set out below.

In general the azo compounds can be dissolved in concentrated sulfuric acid and cyclization is rapidly effected by heating for a short time at a moderate temperature, for example 60 to 100° C. The reaction is so fast that in some cases it may be complete in as little as ten minutes and only rarely are reaction times materially exceeding an hour necessary. In some cases the product crystallizes out of solution and can be filtered from the concentrated sulfuric acid. In other cases it is necessary to drown the reaction mixture in ice water and recover the product by filtration, salting out if necessary.

In order to produce the preferred sulfonated compounds of the present invention it is often convenient to start with an azo compound containing at least one sulfonic group. However, this is not always necessary as in some cases sulfonation is effected during cyclization and in other cases may readily be effected after ring closure is complete.

In general the diazo component used in making the azo compound which is ring closed to form the coloring matters of the present invention may be derived from any diazotizable arylamine such as aniline and its homologs, sulfanilic acid, metanilic acid, anthranilic acid, 4-sulfonanthranilic acid, 5-sulfoanthranilic acid, o-aminophenol, o- and p-anisidine, 2-aminophenol-4-sulfonic acid, 2-amino-4-chlorophenol, 2-amino-4-chlorophenol-5-sulfonic acid, 2-amino-4-chlorophenol-6-sulfonic acid, 2-amino-4-nitrophenol, 2-amino-4-nitrophenol-5-sulfonic acid, 2-amino-4-nitrophenol-6-sulfonic acid, 2-amino-5-nitrophenol, 2-amino-4-methyl-6-nitrophenol, 2-amino-6-nitrophenol-4-sulfonic acid, 1-amino-2-naphthol-4-sulfonic acid, naphthionic acid, 1-naphthylamine-6-sulfonic acid, 1-amino-6-nitro-2-naphthol-4-sulfonic acid, o-dianisidine, 4-chloro-2-aminoanisole, and 4-nitro-2-choroaniline.

The only restriction on the acylacetic arylide used as a coupling component to produce the azo compound is to have a free ortho position to permit ring closure. It is an advantage of the present invention that except for the limitation above any acylacetic arylide may be used. Typical of such compounds are the acetoacetyl and benzoylacetyl derivatives of aniline, the isomeric toluidines, xylidines, anisidines, and chloroanilines, N,N'-bis-(acetoacetyl) benzidine, 2,5-dimethoxy-4-chloroacetoacetanilide, 2,4-dimethoxy-5-chloroacetoacetanilide, acetoacetanilide-p-sulfonic acid, acetoacetanilide-2,5-disulfonic acid, acetoacetyl anthranilic acid, propionylacetanilide, benzoylacetic p-phenylanilide, p-methylbenzoylacetic anilide, p-methoxybenzylacetanilide, p-phenylbenzoylacetanilide, beta-naphthoylacetanilide, and (acetoacetylamino) naphthalene, may also be used.

It is an additional feature of the present invention that the azo carbostyril compounds prepared as described, are useful not only as dyestuffs and pigments in themselves, but can readily be metallized if the diazo component is substituted ortho to the azo linkage by a metallizable group, such as hydroxyl, methoxyl, halogen, or carboxyl. The resulting metal complexes show good all-round fastness; the preferred sulfonated compounds show also good dyeing properties in a variety of shades. The chromium complexes are particularly valuable and may be prepared by known methods. Other metal complexes, such as nickel and copper complexes, may also be prepared from the corresponding salts.

The present invention is illustrated in detail in the following examples. Parts are by weight.

*Example 1*

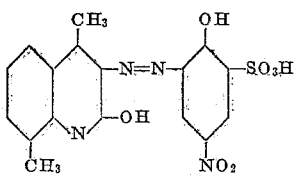

A solution of 45.2 parts of 2-amino-4-nitrophenol-6-sulfonic acid in 480 parts of water and 127 parts of 10% sodium carbonate solution is treated with 38 parts of concentrated hydrochloric acid, cooled to 5–10° C., and diazotized in the normal manner with 5N sodium nitrite. Any excess of nitrite is destroyed with sulfamic acid. The diazo is then added rapidly at 5°–10° to a solution of 40 parts of acetoacet o-toluidide in 600 parts of water and 33 parts of 5N sodium hydroxide solution. Coupling is rapid and complete. The reaction mixture is heated to 50° C., acidified to pH 5–7 with 5N sulfuric acid, stirred ten minutes, filtered hot, washed and dried at 60°. The resulting product dyes wool yellow.

Forty parts of the dyestuff thus prepared are stirred into 110 parts of concentrated sulfuric acid. The mixture is then slowly and carefully heated. After five minutes at 75° C., crystallization takes place. The mixture is cooled to 50° and filtered. The resulting dark red azo carbostyril dyestuff may be metallized by refluxing in chromic acetate solution according to the procedure given in Example 3.

*Example 2*

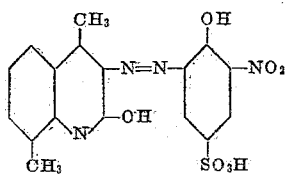

2-amino-6-nitrophenol-4-sulfonic acid is diazotized and coupled with acetoacet-o-toluidide according to the procedure described in Example 1. Seventy parts of the resulting yellow crystalline dyestuff is stirred into 137 parts of concentrated sulfuric acid. The mixture is then stirred at 60° C. for one hour, cooled to 40° C., and drowned in 400 parts of ice water. The product is filtered, washed with water, and purified by slurrying in acetone and filtration. It is a reddish homogeneous crystalline material which dyes wool reddish-orange. It can be metallized by refluxing in chromium acetate solution, according to the procedure which is described in detail in Example 3.

*Example 3*

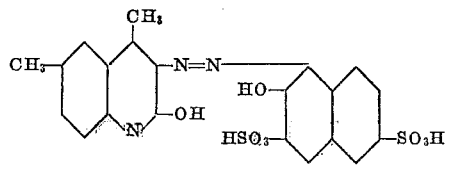

1-amino-2-naphthol-3,6-disulfonic acid is diazotized and coupled with acetoacet-p-toluidide according to the procedure described in Example 1. Fifteen parts of the resulting orange dyestuff is added in portions to 49 parts of concentrated sulfuric acid. The resulting mixture is carefully heated to 80–85° C., kept at this temperature about five minutes, and then drowned in water. The product is filtered, washed with 10% sodium chloride solution, and dried. It gives bluish red dyeings on nylon and wool. As a chrome dye it gives garnet to Bordeaux shades.

Metallization of this, and other dyestuffs of the present invention, is carried out with the aid of a chromium acetate solution which is prepared in the following way: Chromic acid (136 parts) is dissolved in 1156 parts of water. To the solution is added 163 parts of glacial acetic acid and 50 parts of glucose. The solution is then slowly heated to the boil and gently boiled until the chromic acid is completely reduced. After cooling, the solution is diluted to the volume of 2000 parts of water.

The above prepared azo carbostyril compound (30.3 parts) is metallized by refluxing eighteen hours in 300 parts of water containing 60 parts of 20% sodium acetate solution, 100 parts of the above prepared chromium acetate solution, and 130 parts of 90% formic acid. The solution is then diluted, cooled, and filtered. The metallized dyestuff dyes wool Bordeaux shades.

*Example 4*

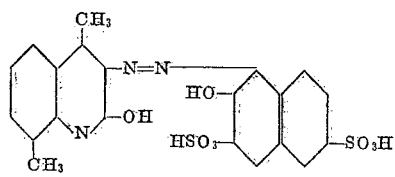

The dyestuff of the above structure is prepared from 1-amino-2-naphthol-3,6-disulfonic acid and acetoacet-o-toluidide by the process of Example 3. The chromium complex gives wool dyeings of Bordeaux shades.

*Example 5*

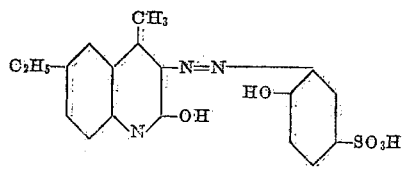

2-aminophenol-4-sulfonic acid is diazotized and coupled with acetoacet-p-ethylanilide according to the procedure described in Example 1. Ten parts of the resulting yellow dyestuff is added with stirring over a one-half hour period to 27 parts of concentrated sulfuric acid at 80–90° C. The mixture is then heated at 90–100° for five minutes, cooled to 70°, and drowned with vigorous stirring in 200 parts of ice water. The resulting red dyestuff is filtered, washed, and dried. It dyes wool tan shades and gives brown chrome dyeings. It can be metallized according to the general procedure described in Example 3.

*Example 6*

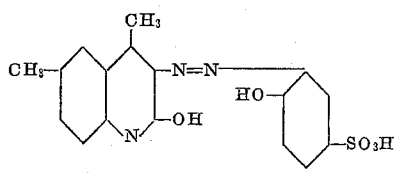

2-aminophenol-4-sulfonic acid is diazotized and coupled with acetoacet-p-toluidide according to the general procedure described in Example 1. Thirty parts of the resulting dyestuff is added at room temperature to 73 parts of concentrated sulfuric acid. When the spontaneous temperature rise has subsided, the mixture is cautiously heated to 80-85°, maintained at this temperature for ten minutes, allowed to cool, and filtered. The orange-red product is washed with acetone. It gives brown chrome dyeings. It may be metallized by the general procedure described in Example 3.

*Example 7*

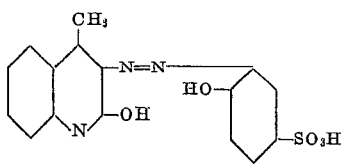

2-aminophenol-4-sulfonic acid is diazotized and coupled with acetoacetanilide. The product is cyclized according to the procedure of Example 6, and the resulting azo carbostyril dyestuff, of the above formula, metallized according to the general procedure of Example 3.

*Example 8*

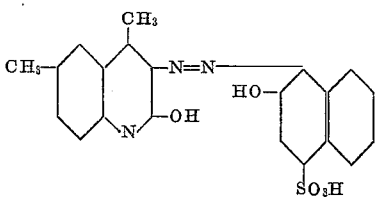

1-amino-2-naphthol-4-sulfonic acid is diazotized and coupled with acetoacet-p-toluidide. The product is cyclized according to the procedure of Example 2. It gives brown to olive chrome dyeings, and may be metallized according to the general procedure of Example 3.

I claim:

1. A 3-arylazo carbostyril substituted in the 4 position by the radical of a functionally saturated hydrocarbon.

2. An arylazo carbostyril according to claim 1 having a metallizable group ortho to the azo group selected from the group consisting of a hydroxyl, methoxyl, halogen and carboxyl.

3. A compound according to claim 2 in which the aryl radical is sulfonated.

4. A compound according to claim 3 having the formula

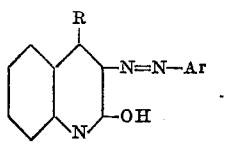

in which R is a functionally saturated hydrocarbon radical and Ar is an aromatic radical having a metallizable group ortho to the azo group.

5. A compound having the following formula

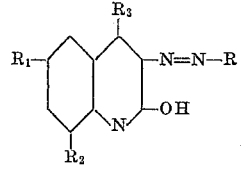

in which $R_1$, $R_2$, and $R_3$ are selected from the group consisting of hydrogen and functionally saturated hydrocarbon radicals and R is a sulfonated aryl radical substituted by a metallizable group in the ortho position to the azo linkage.

6. A compound according to claim 5 in which $R_3$ is methyl.

7. A compound according to claim 6 in which R is a sulfonated radical of the naphthalene series.

8. A dyestuff of the formula

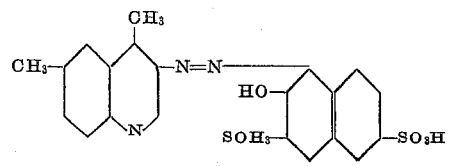

9. A dyestuff of the formula

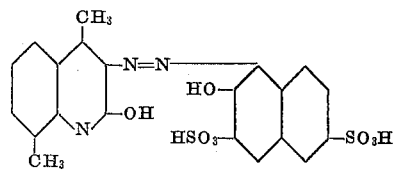

10. A process of cyclizing an acylacetic arylide, containing a free position ortho to the amide nitrogen, and substituted in the alpha position by an arylazo radical containing at most two carbocyclic rings, to the corresponding 3-arylazocarbostyril, by heating in concentrated sulfuric acid until ring closure is effected.

11. A process according to claim 10 in which the arylide is an anilide.

12. A process according to claim 10 in which the arylazo group is sulfonated and is substituted ortho to the azo linkage by a metallizable substituent selected from the group consisting of hydroxyl, methoxyl, halogen, and carboxyl.

13. A process according to claim 10 in which the arylide is an acetoacetanilide.

JOSEPH SERUTO.

References Cited in the file of this patent

UNITED STATES PATENTS

| Number | Name | Date |
|---|---|---|
| 1,052,031 | Blank | Feb. 4, 1913 |
| 1,775,644 | Krammerer et al. | Sept. 16, 1930 |
| 1,908,571 | Straub et al. | May 9, 1933 |
| 2,364,347 | Dickey et al. | Dec. 5, 1944 |

FOREIGN PATENTS

| Number | Country | Date |
|---|---|---|
| 20,530 | Great Britain | of 1895 |
| 28,716 | Great Britain | of 1909 |

OTHER REFERENCES

Hollins "Synthesis of Nitrogen Ring Compounds," 1924, pages 266, 267 and 269.